(12) United States Patent
Lee et al.

(10) Patent No.: US 10,771,691 B2
(45) Date of Patent: Sep. 8, 2020

(54) MOBILE TERMINAL AND CONTROLLING METHOD THEREOF

(71) Applicant: LG ELECTRONICS INC., Seoul (KR)

(72) Inventors: Sunhyuk Lee, Seoul (KR); Bumbae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 159 days.

(21) Appl. No.: 15/445,842

(22) Filed: Feb. 28, 2017

(65) Prior Publication Data

US 2017/0171467 A1 Jun. 15, 2017

Related U.S. Application Data

(63) Continuation of application No. 14/176,796, filed on Feb. 10, 2014, now Pat. No. 9,621,800.

(30) Foreign Application Priority Data

Sep. 4, 2013 (KR) .................. 10-2013-0106353

(51) Int. Cl.
*H04N 5/232* (2006.01)
*H04N 5/272* (2006.01)
*H04N 5/445* (2011.01)

(52) U.S. Cl.
CPC ..... *H04N 5/23238* (2013.01); *H04N 5/23216* (2013.01); *H04N 5/23293* (2013.01); *H04N 5/272* (2013.01); *H04N 5/44504* (2013.01)

(58) Field of Classification Search
CPC .......... H04N 5/23238; H04N 5/44504; H04N 5/23293; H04N 5/23216; H04N 5/272
(Continued)

(56) References Cited

U.S. PATENT DOCUMENTS 6,344,907 B1 * 2/2002 Watanabe ............. G06F 3/0481
358/448
6,515,704 B1 * 2/2003 Sato ................... H04N 1/00442
348/333.05
(Continued)

FOREIGN PATENT DOCUMENTS

KR 1020100027543 3/2010

OTHER PUBLICATIONS

U.S. Appl. No. 14/176,796, Office Action dated Feb. 10, 2014, 10 pages.
(Continued)

*Primary Examiner* — Tung T Vo
(74) *Attorney, Agent, or Firm* — Lee, Hong, Degerman, Kang & Waimey

(57) ABSTRACT

A mobile terminal and controlling method thereof are disclosed, by which a plurality of images are synthesized. The present invention includes a camera configuring to acquire a first image in response to a shooting command and a plurality of second images on a preset condition, a controller creating a synthetic image by synthesizing a whole part of the acquired first image and at least one portion of a plurality of the acquired second images, and a display unit configured to display the created synthetic image, wherein the controller controls a prescribed visual effect to be displayed on the synthetic image to indicate a region corresponding to the first image.

9 Claims, 17 Drawing Sheets

(58) Field of Classification Search
USPC .......................................................... 348/333
See application file for complete search history.

(56) References Cited

U.S. PATENT DOCUMENTS

| | | | | |
|---|---|---|---|---|
| 7,480,002 B2* | 1/2009 | Goh | ................... | H04N 5/23245 348/333.01 |
| 7,656,451 B2* | 2/2010 | Yanagi | ................ | H04N 1/2112 348/333.05 |
| 7,714,925 B2* | 5/2010 | Kim | ..................... | H04N 1/0035 348/231.2 |
| 7,714,926 B2* | 5/2010 | Kobayashi | ......... | H04N 5/23293 348/333.05 |
| 7,847,851 B2* | 12/2010 | Choi | ...................... | G03B 19/00 348/333.05 |
| 8,004,582 B2* | 8/2011 | Koutaki | ................. | H04N 5/772 348/231.2 |
| 8,081,227 B1* | 12/2011 | Kim | ................... | H04N 5/23293 348/211.3 |
| 8,477,228 B2* | 7/2013 | Stallings | ............ | H04N 1/00132 348/207.1 |
| 8,953,080 B2* | 2/2015 | Hirata | ................ | H04N 5/23219 348/222.1 |
| 9,204,051 B2* | 12/2015 | Masugi | ............... | H04N 5/23216 |
| 9,591,227 B2* | 3/2017 | Matas | .................... | H04N 5/772 |
| 2001/0024236 A1* | 9/2001 | Sato | ................... | H04N 1/00127 348/239 |
| 2005/0036044 A1* | 2/2005 | Funakura | ........... | G06K 9/00228 348/239 |
| 2005/0094000 A1* | 5/2005 | Son | ........................ | H04N 5/772 348/231.99 |
| 2005/0140802 A1* | 6/2005 | Nam | ....................... | H04N 5/272 348/239 |
| 2006/0098111 A1* | 5/2006 | Goh | ........................ | H04N 5/23245 348/333.05 |
| 2006/0120712 A1* | 6/2006 | Kim | ........................ | G06T 7/194 396/333 |
| 2010/0124941 A1* | 5/2010 | Cho | .................. | H04M 1/72544 455/556.1 |
| 2015/0062288 A1 | 3/2015 | Lee et al. | | |

OTHER PUBLICATIONS

Korean Intellectual Property Office Application No. 10-2013-0106353, Office Action dated May 20, 2019, 5 pages.

* cited by examiner (a)

(b)

(a)

(b)

(a)

(b)

(a)

(b)

(a)

(b)

MOBILE TERMINAL AND CONTROLLING METHOD THEREOF

This application is a continuation of U.S. patent application Ser. No. 14/176,796, filed on Feb. 10, 2014, now U.S. Pat. No. 9,621,800, which claims the benefit of earlier filing date and right of priority to Korean Application No. 10-2013-0106353, filed on Sep. 4, 2013, the contents of which are all hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

When a photo is taken using a camera built in a terminal, an image corresponding to a timing of pressing a photographing button is saved in general. In case of editing the saved image, it is able to edit the image acquired by the photographing button using a photo editing function installed on the terminal or a photo editing application downloaded to the terminal.

Recently, a panoramic photo function of creating a panoramic photo in a manner of acquiring several images and then synthesizing them into a single photo has been introduced. However, the panoramic photo function just provides an image created in a manner of synthesizing several photos.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a single synthetic image is created in a manner of synthesizing a plurality of images.

Another object of the present invention is to provide a mobile terminal and controlling method thereof, by which the created synthetic image can be utilized and edited in various ways.

A further object of the present invention is to provide a mobile terminal and controlling method thereof, by which audio can be provided in accordance with an editing result of a synthetic image using audio data obtained together with an image.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a camera configuring to acquire a first image in response to a shooting command and a plurality of second images on a preset condition, a controller creating a synthetic image by synthesizing a whole part of the acquired first image and at least one portion of a plurality of the acquired second images, and a display unit configured to display the created synthetic image, wherein the controller controls a prescribed visual effect to be displayed on the synthetic image to indicate a region corresponding to the first image.

In another aspect of the present invention, a method of controlling a mobile terminal according to one embodiment of the present invention may include the steps of acquiring a first image in response to a shooting command and a plurality of second images on a preset condition using a camera, creating a synthetic image by synthesizing a whole part of the acquired first image and at least one portion of a plurality of the acquired second images, and displaying the created synthetic image, wherein a prescribed visual effect is displayed on the synthetic image to indicate a region corresponding to the first image.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
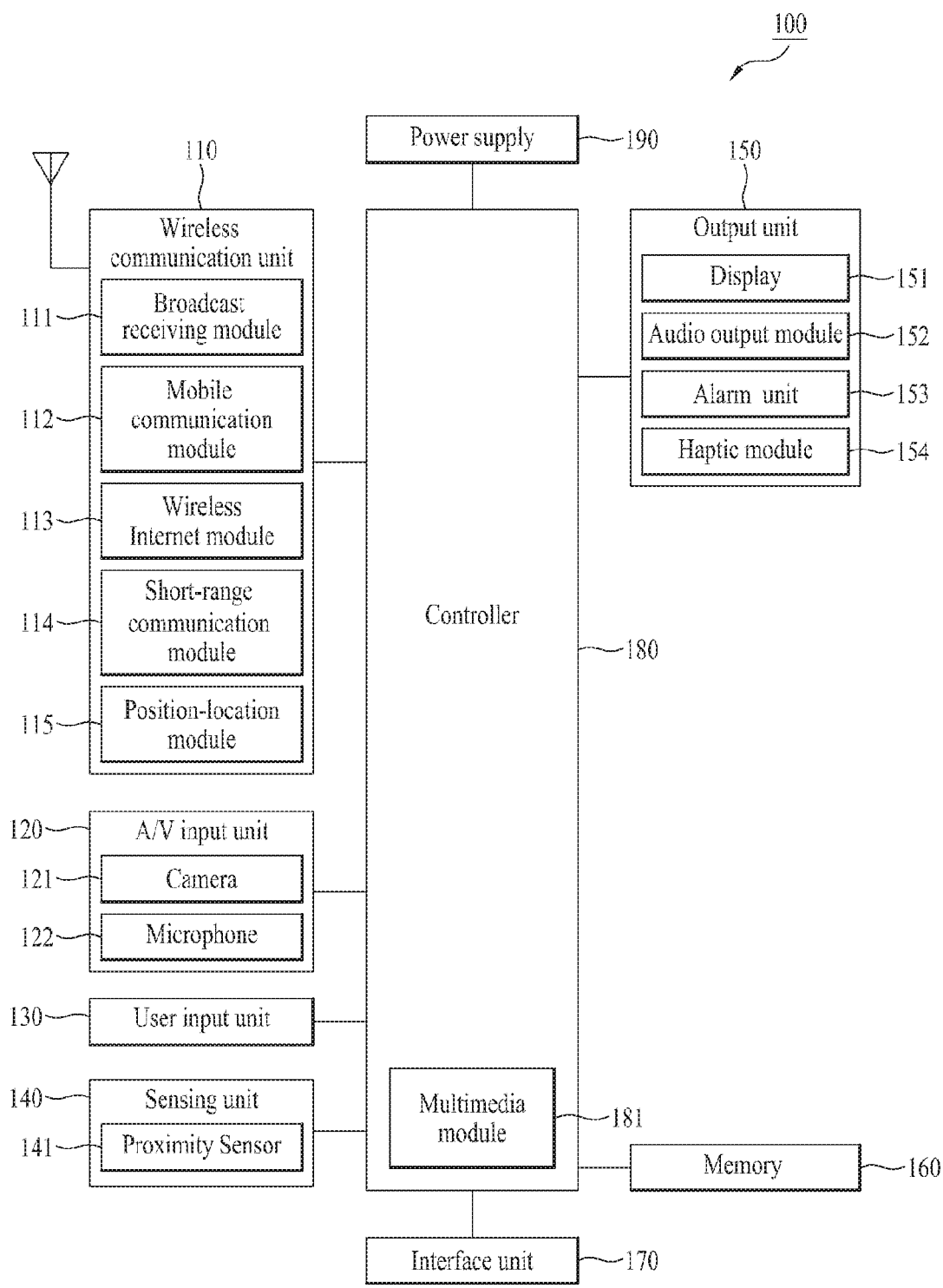
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal. At least two microphones 122 may be provided. For instance, in case that the at least two microphones 122 exist, one of the two microphones 122 is slanted to one side (e.g., a left side) in the mobile terminal 100, while the other is slanted to another side (e.g., a right side) in the mobile terminal 100.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
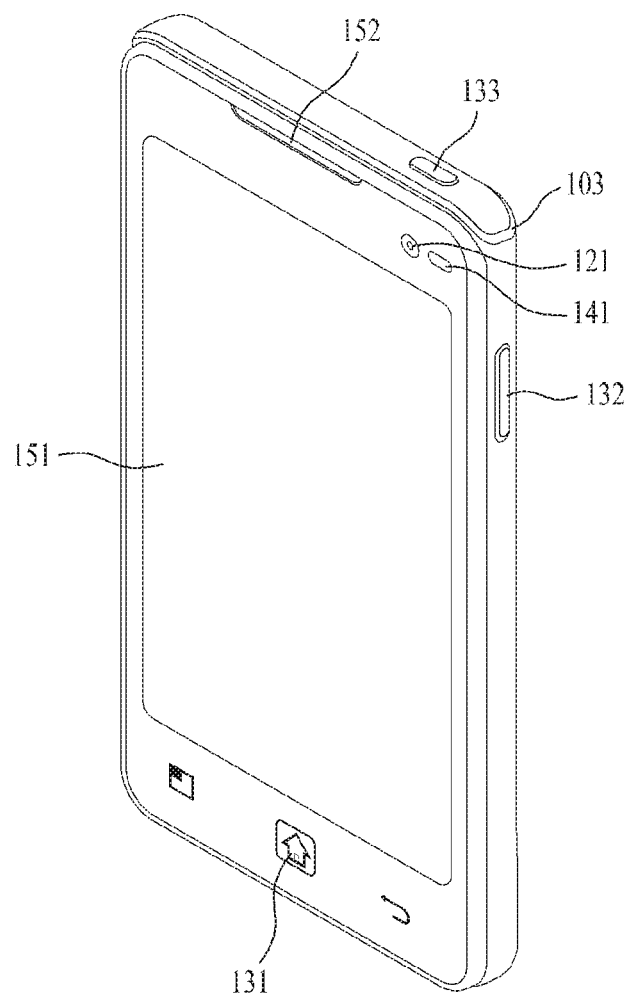
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
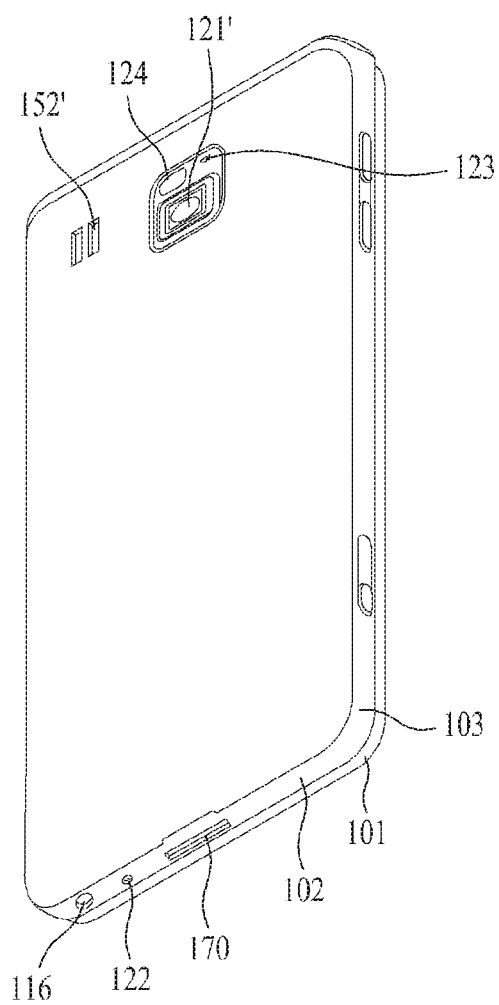
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad for detecting a touch can be additionally provided to the rear case 102. The touchpad can be configured in a light transmittive type like the display 151. In this case, if the display 151 is configured to output visual information from its both faces, it is able to recognize the visual information via the touchpad as well. The information outputted from both of the faces can be entirely controlled by the touchpad. Alternatively, a display is further provided to the touchpad so that a touchscreen can be provided to the rear case 102 as well.

The touchpad is activated by interconnecting with the display 151 of the front case 101. The touchpad can be provided in rear of the display 151 in parallel. The touchpad can have a size equal to or smaller than that of the display 151.

In the following description, embodiments related to a controlling method implemented in the above-configured mobile terminal 100 are explained with reference to the accompanying drawings.

For clarity and convenience of the following description, assume that a mobile terminal 100 mentioned in the following description includes at least one of the components shown in FIG. 1. In particular, a mobile terminal 100 according to the present invention may include the user input unit 130, the display unit 151, the memory 160 and the controller 180. In some cases, the mobile terminal 100 according to the present invention may further include the proximity sensor 141. If the display module 151 includes a touchscreen 151, implementation of the following embodiments may be further facilitated. Therefore, the following description is made on the assumption that the display module 151 includes the touchscreen 151. Moreover, if the user input unit 130 includes the touch sensor 137, the touchscreen 151 may be usable as the user input unit 130.

According to the present invention, the mobile terminal 100 may become a sender terminal or a receiver terminal depending on a corresponding embodiment.

The mobile terminal according to one embodiment of the present invention preferably includes the camera 121, the controller 180, the display unit 151, the memory 160, the microphone 122, the audio output module 152 and the like, by which the present invention may be non-limited. And, it is apparent to those skilled in the art that at least operation of the above-enumerated components can be omitted.

Modules configuring the mobile terminal 100 are described in association with embodiments of the present invention as follows.

First of all, the camera 121 acquires a first image in response to a shooting command and also acquires a plurality of second images in accordance with a preset condition.

The first image is acquired in response to a user's shooting command like the case that a user takes a photo using the camera 121 in general.

A plurality of the second images are acquired in accordance with a preset condition in case that a user intends to acquire the first image. For instance, a plurality of the second images are acquired periodically or aperiodically for a prescribed time ranging from a timing point of activating a program or application for the photographing to a timing point of receiving a shooting command, a prescribed time interval before/after receiving a shooting command from a timing point of activating a program or application for the photographing, or a prescribed time after receiving a shooting command, by which the present invention may be non-limited. Images acquired through the camera 121 in accordance with a preset condition are commonly called a second image. And, it is unnecessary for the second image to mean a photographed image of a same part of a same subject.

The memory 160 stores the acquired first image and a plurality of the acquired second images. In some cases, the memory 160 may play a role in temporarily storing the acquired first image and a plurality of the acquired second images until a synthetic image, which will be described later, is created.

The controller 180 creates a synthetic image based on the first image and a plurality of the second images. The controller 180 can select images, which will be used for creation of the synthetic image, from the first image and a plurality of the second images with reference to resolution. Since the first image acquired in response to a shooting command while a user focuses a camera lens for the purpose of taking a photo, the resolution of the first image may be higher than that of a plurality of the second images acquired in accordance with a preset condition. Hence, the controller 180 can create the synthetic image using the whole first image and at least one portion of a plurality of the second images.

The controller 180 controls the display unit 151 to display a prescribed visual effect for indicating a region corresponding to the first image in the synthetic image.

In case that at least two of a plurality of the second images include the same region, the controller 180 can create a synthetic image using an image having a highest resolution of the same region among the at least two images. In creating the synthetic image, a whole part of each of a plurality of the second images is usable or a partial region of the corresponding image may be usable depending on the resolution. For instance, the controller 180 can determine the resolution based on a contrast value.

Algorithm or program for the image synthesis may be saved in the memory 160.

The display unit 151 displays the created synthetic image. In doing so, the synthetic image may be partially displayed on a screen of the display unit 151. Alternatively, a portion or whole part of the synthetic image may be displayed on the screen of the display unit 151 in a manner of having its display magnification reduced.

The first image in the exact size acquired by the camera 121 may be included in the synthetic image.

On the contrary, each of a plurality of the second images used for the creation of the synthetic image may exist in the synthetic image in a manner of overlaying the second image adjacent to the corresponding second image in part at least.

The synthetic image includes a first region meeting a first condition and a second region meeting a second region. In this case, according to the first condition, a resolution is equal to or greater than a specific value. According to the second condition, a resolution is smaller than the specific value. Hence, the second region meeting the second condition is larger than the first region and includes the first region. The first region may correspond to the first image acquired by the camera 121. In some cases, the synthetic image may further include a $3^{rd}$ region that meets a $3^{rd}$ condition. In this case, the resolution according to the $3^{rd}$ condition is smaller than that according to the second condition.

The controller 180 can control the display unit 151 to display an indicator indicating the first region and an indicator indicating the second region on the synthetic image. In some cases, the controller 180 may control the display unit 151 to further display an indicator indicating the $3^{rd}$ region on the synthetic image. For instance, the $3^{rd}$ region may correspond to the whole synthetic image.

A first thumbnail image corresponding to the first region and a second thumbnail image corresponding to the second region can be displayed on the screen of the display unit 150. In some cases, the display unit 151 may further display a $3^{rd}$ thumbnail image corresponding to the $3^{rd}$ region. If a first command for selecting the first thumbnail image is detected, the controller 180 controls the first region to be displayed on the display unit 151. If a second command for selecting the second thumbnail image is detected, the controller 180 controls the second region to be displayed on the display unit 151. If a $3^{rd}$ command for selecting the $3^{rd}$ thumbnail image is detected, the controller 180 can control the $3^{rd}$ region to be displayed on the display unit 151.

The controller 180 control electric audio data to be generated by receiving an external audio signal through the microphone 122 for a time ranging from a timing point of acquiring a first acquired image from the first image and a plurality of the second images to a timing point of acquiring a last acquired image from the first image and a plurality of the second images. In particular, the microphone 122 continuously receives the audio signal for the time ranging from the timing point of acquiring the first acquired image from the first image and a plurality of the second images to the timing point of acquiring the last acquired image from the first image and a plurality of the second images and then generates the electric audio data based on the received audio signal.

The memory 160 stores the generated audio data. The controller 180 controls each of the first image and a plurality of the second images to be saved in the memory 160 in a manner of being matched with a part of the audio data corresponding to the timing point of acquiring each of the first image and a plurality of the second images in the audio data.

The controller 180 can control the audio output module 152 to output the audio data in a preset interval from the part of the audio data corresponding to the first image acquired timing point in the whole audio data.

If a specific command is detected, the controller 180 can control the audio output module 152 to output a part of the audio data corresponding to images configuring the second region among the first image and a plurality of the second images.

For instance, assume that the images configuring the second region include the first image and two second images, that the two second images include a first subimage and a second subimage, respectively, that the first subimage is acquired by the camera 121 in the first place, and that the first image and the second subimage are then acquired by the camera 121 in order. On this assumption, if the specific command is detected, the controller 180 can control the audio output module 152 to output parts of the audio data ranging from an audio data part corresponding to a timing point of acquiring the first subimage to an audio data part corresponding to a timing point of acquiring the second subimage. In this case, the audio data parts corresponding to the images configuring the second region are taken as an example for this description. Moreover, since the above method can be similarly applied to a case of outputting audio data parts corresponding to images configuring the $3^{rd}$ region or audio data parts corresponding to images configuring a prescribed region selected by a user, corresponding details shall be omitted from the following description.

In the following description, embodiments of the present invention are explained in detail with reference to the accompanying drawings.

Figure 3:
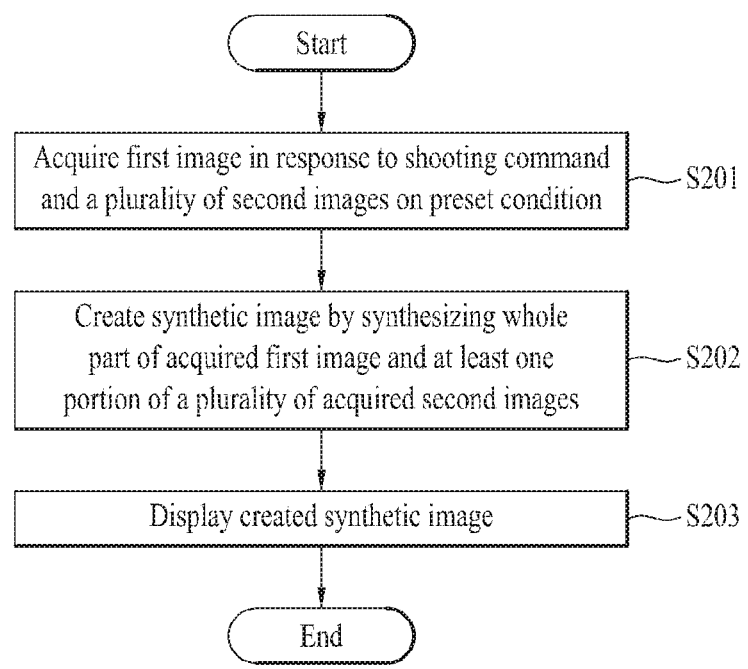
FIG. 3 is a flowchart for a method of controlling a mobile terminal according to one embodiment of the present invention.

FIG. 3 is a flowchart for a method of controlling a mobile terminal according to one embodiment of the present invention.

Referring to FIG. 3, the camera 121 of the mobile terminal 100 acquires a first image in response to a shooting command and a plurality of second images according to a preset condition [S201]. According to an embodiment, the controller 180 can control electric audio data to be generated in a manner of receiving an external audio signal through the microphone 122 for a time ranging from a timing point of acquiring a first acquired image from the first image and a plurality of the second images to a timing point of acquiring a last acquired image from the first image and a plurality of the second images.

The memory 160 can store the acquired first image, a plurality of the acquired second images and the audio data.

The controller 180 of the mobile terminal 100 creates a synthetic image by synthesizing the whole first image and at least one portion of a plurality of the second images [S202]. The memory 160 can store the created synthetic image.

The display unit 151 of the mobile terminal 100 displays the synthetic image [S203]. In doing so, the synthetic image may be partially displayed on a screen of the display unit 151. Alternatively, a portion or whole part of the synthetic image may be displayed on the screen of the display unit 151 in a manner of having its display magnification reduced.

In the following description, a synthetic image and a process for creating the synthetic image are explained in detail with reference to FIGS. 4 to 6.

Figure 4:
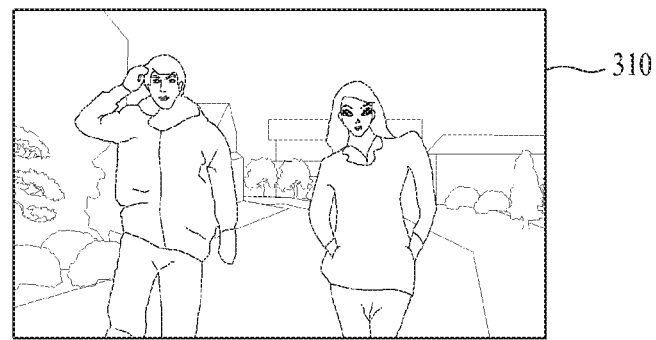
FIG. 4 is a diagram for one example of a synthetic image created from a mobile terminal according to one embodiment of the present invention.
Figure 4:
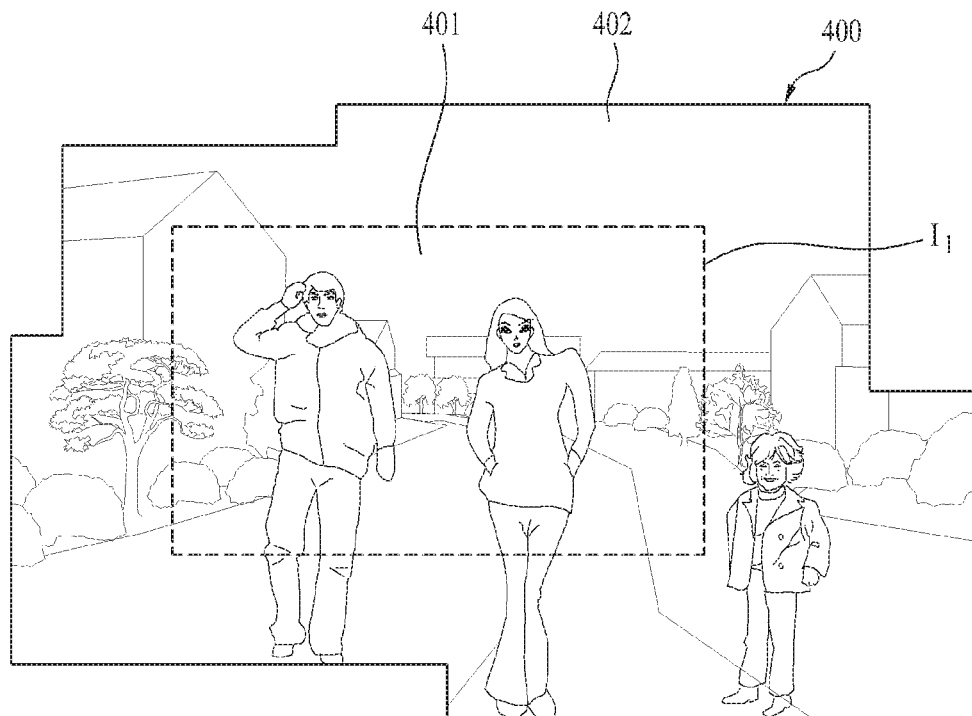

FIG. 4 is a diagram for one example of a synthetic image created from a mobile terminal according to one embodiment of the present invention.

FIG. 4(a) shows a first image acquired by the camera 121 in response to a shooting command. FIG. 4(b) shows one example of a synthetic image 400 created based on the first image 310 acquired by the camera 121 in response to the shooting command and a plurality of the second images acquired by the camera 122 in accordance with a preset condition.

In the synthetic image, a prescribed visual effect $I_1$ indicating a region 401 corresponding to the first image 310 is displayed. For example, referring to FIG. 4(b), as the prescribed visual effect indicating the region 401 corresponding to the first image, a first indicator $I_1$ indicating an outline of the region 401 corresponding to the first image 310 is displayed on the synthetic image 400. In doing so, the first image 310 can be included in the synthetic image 400 by maintaining the exact size acquired by the camera 121.

In the synthetic image 400, a region 402 except the region 401 corresponding to the first image 310 is created using at least one portion of a plurality of the second images acquired according to the preset condition. In the synthetic image 400, the region 402 except the region 401 corresponding to the first image 310 may exist in a manner that at least two adjacent images among a plurality of the second images overlay each other in part at least.

Figure 5:
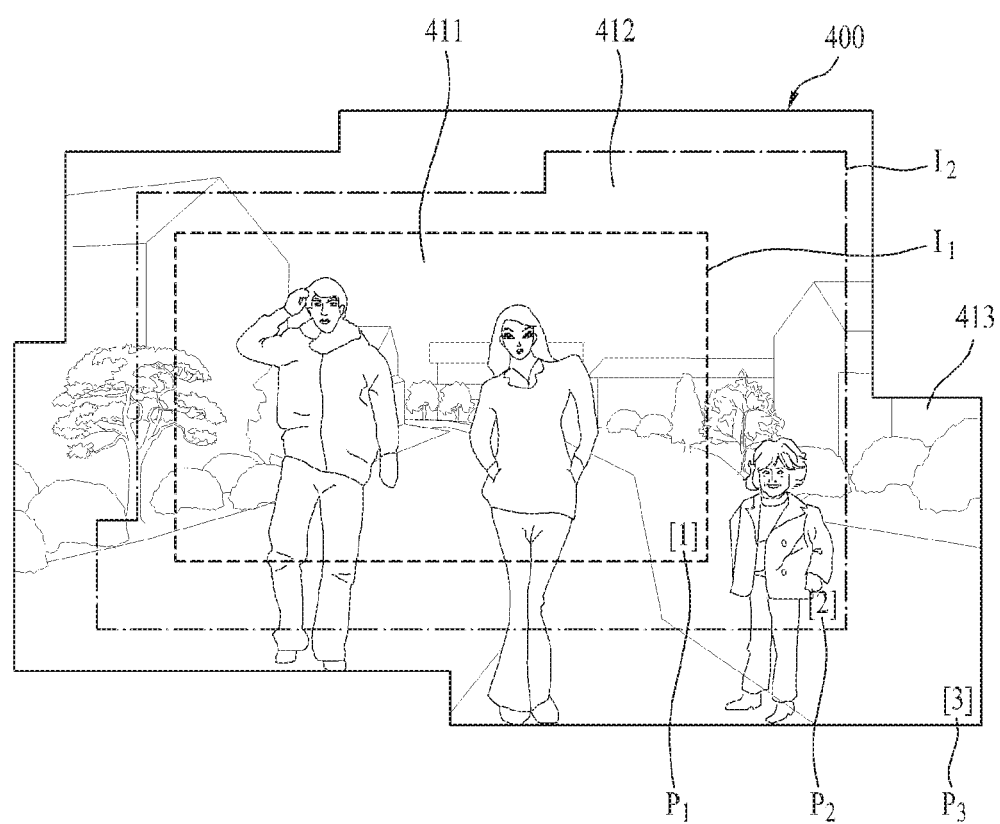
FIG. 5 is a diagram for another example of a synthetic image created in a mobile terminal according to one embodiment of the present invention.

FIG. 5 is a diagram for another example of a synthetic image created in a mobile terminal according to one embodiment of the present invention.

Referring to FIG. 5, a synthetic image 400 created based on the first image 310 acquired by the camera 121 in response to the shooting command and a plurality of the second images acquired by the camera 122 in accordance with a preset condition is shown.

The synthetic image 400 includes a first region 411 meeting a first condition, a second region 412 meeting a second region by including the first region 411, and a $3^{rd}$ region 413 meeting a $3^{rd}$ condition by including the second region 412. In this case, the first condition includes a condition having a resolution set equal to or greater than a specific value, the second condition includes a condition having a resolution set smaller than the specific value, and the $3^{rd}$ condition may include a condition having a resolution set smaller than that of the second condition. For instance, the first region 411 may include the region corresponding to the first image 310 acquired by the camera 121 in response to the shooting command and the $3^{rd}$ region 412 may include the region corresponding to the whole synthetic image 400.

On the synthetic image 400, a first indicator $I_1$ indicating the first region 411 and a second indicator $I_2$ indicating the second region 412 may be displayed. For instance, the first indicator $I_1$ may indicate an outline of the first region 411 and the second indicator $I_2$ may indicate an outline of the second region 412.

Moreover, in the synthetic image 400, indicators $P_1$ to $P_3$ indicating informations on the first to $3^{rd}$ regions 411 to 413 may be displayed on the first to $3^{rd}$ regions 411 to 413, respectively. For instance, the indicators $P_1$ to $P_3$ may include texts, pictures, graphic images and the like, which indicate informations on the first to $3^{rd}$ regions 411 to 413, respectively.

Figure 6:
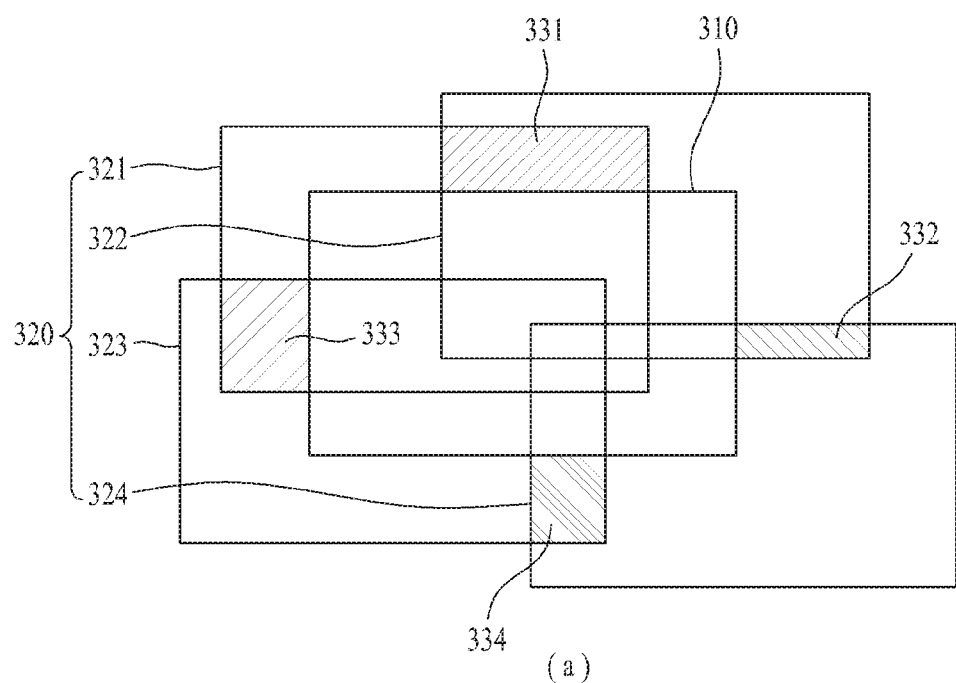
FIG. 6 is a diagram to describe one example of a process for creating a synthetic image in a mobile terminal according to one embodiment of the present invention.
Figure 6:
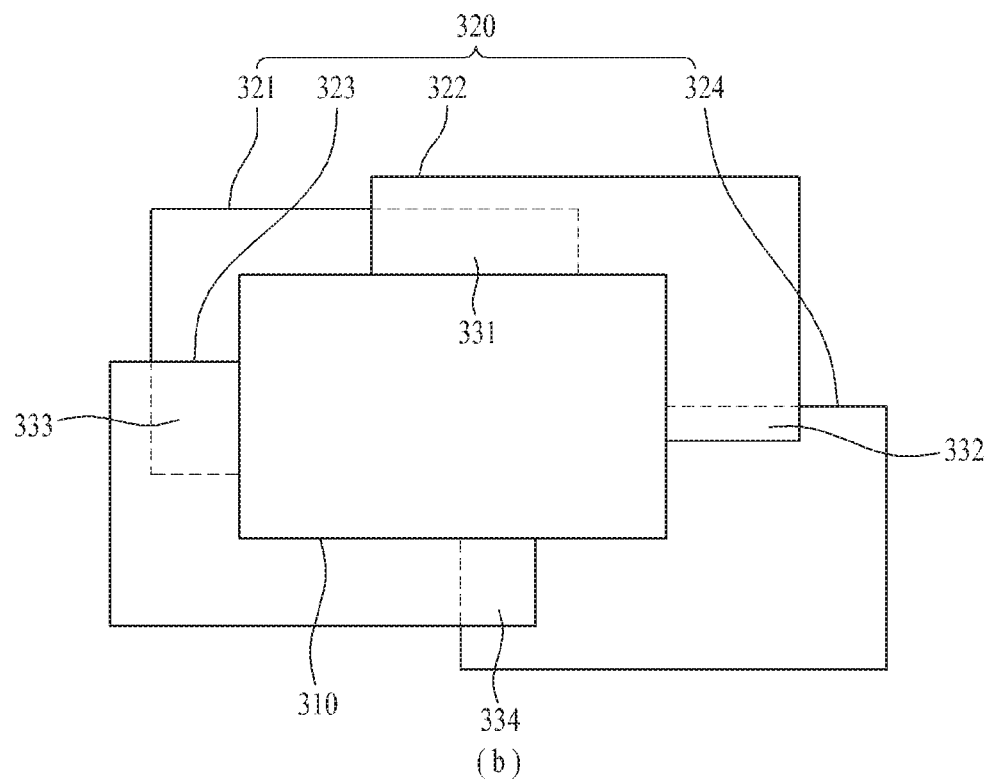

FIG. 6 is a diagram to describe one example of a process for creating a synthetic image in a mobile terminal according to one embodiment of the present invention, by which the synthetic image creating process according to the present invention may be non-limited.

FIG. 6(a) shows that a first image 310 and a plurality of second images 320 are arranged in a manner of overlaying each other to connect objects in the images to each other. FIG. 6(b) shows that the first image 310 and a plurality of the second images 320 are rearranged by determining the before-after relationship of adjacent images shown in FIG. 6 (a).

Referring to FIG. 6, the controller 180 creates a synthetic image 400 based on the first image 310 and a plurality of the second images 320. In particular, the controller 180 can select images to use for the creation of the synthetic image 400 from the first image 310 and a plurality of the second images 320 with reference to resolution. The controller 180 can create the synthetic image 400 by synthesizing at least one portion of the first image 310 and a plurality of the second images 320.

In FIG. 6, for example of a plurality of the second images 320 to be used for the creation of the synthetic image 400, a first subimage 321, a second subimage 322, a $3^{rd}$ subimage 323 and a $4^{th}$ subimage 324 are shown.

Since the resolution of the first image 310 acquired in response to a shooting command is generally greater than that of the second images 320, referring to FIG. 6(b), the following description is made on the assumption of the case of using the whole first image 310 for the creation of the synthetic image 400, by which the present invention may be non-limited.

In case that at least two of a plurality of the second images 320 include the same region, the controller 180 creates the synthetic image 400 using an image having the highest resolution of the same region among the at least two images. When the synthetic image 400 is created, a whole part of each of a plurality of the second images 320 may be used or a partial region of the corresponding image may be usable depending on the resolution.

Referring to FIG. 6(a), the controller 180 compares the resolutions of the region 331 in the first subimage 321 and the second subimage 322, each of which includes the same region 331. As a result of the comparison, if the resolution of the region 331 in the second subimage 322 is greater than that of the region 331 in the first subimage 321, referring to FIG. 6(b), the controller 180 creates the synthetic image 400 using the region 331 included in the second subimage 322.

The controller 180 compares the resolutions of the region 332 in the second subimage 322 and the $4^{th}$ subimage 324, each of which includes the same region 332. As a result of the comparison, if the resolution of the region 332 in the second subimage 322 is greater than that of the region 332 in the $4^{th}$ subimage 324, the controller 180 creates the synthetic image 400 using the region 332 included in the second subimage 322.

The controller 180 compares the resolutions of the region 333 in the first subimage 321 and the $3^{rd}$ subimage 323, each of which includes the same region 333. As a result of the comparison, if the resolution of the region 333 in the $3^{rd}$ subimage 323 is greater than that of the region 333 in the first subimage 321, the controller 180 creates the synthetic image 400 using the region 333 included in the $3^{rd}$ subimage 323.

And, the controller 180 compares the resolutions of the region 334 in the $3^{rd}$ subimage 323 and the $4^{th}$ subimage 324, each of which includes the same region 334. As a result of the comparison, if the resolution of the region 334 in the $3^{rd}$ subimage 323 is greater than that of the region 334 in the $4^{th}$ subimage 324, the controller 180 creates the synthetic image 400 using the region 334 included in the $3^{rd}$ subimage 323.

In the following description, a synthetic image 400 displayed on the display unit 151 of the mobile terminal 100 is explained in detail with reference to FIG. 7.

Figure 7:
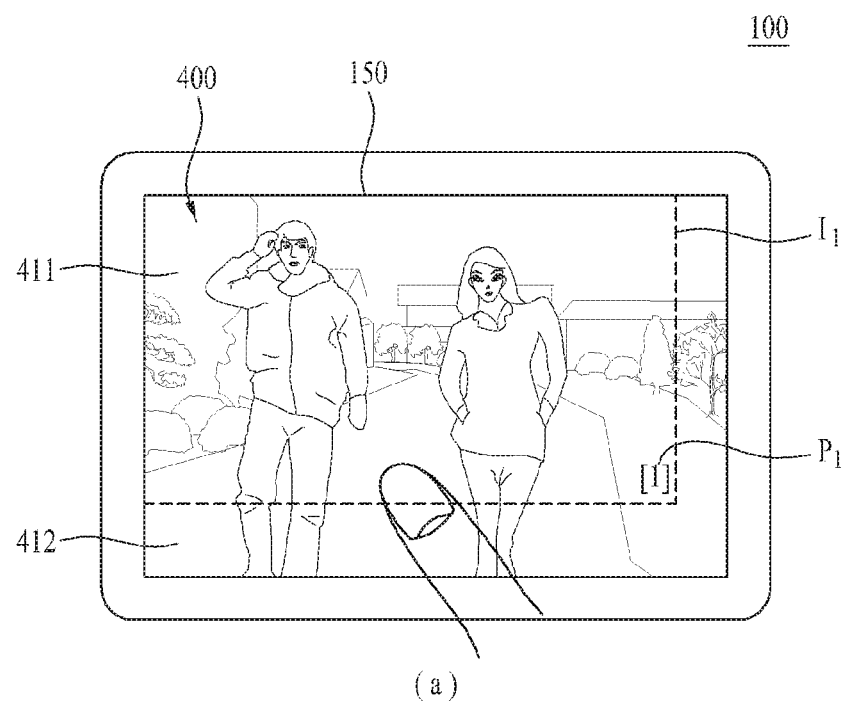
FIG. 7 is a diagram for one example of a synthetic image displayed on a display unit of a mobile terminal according to one embodiment of the present invention.
Figure 7:
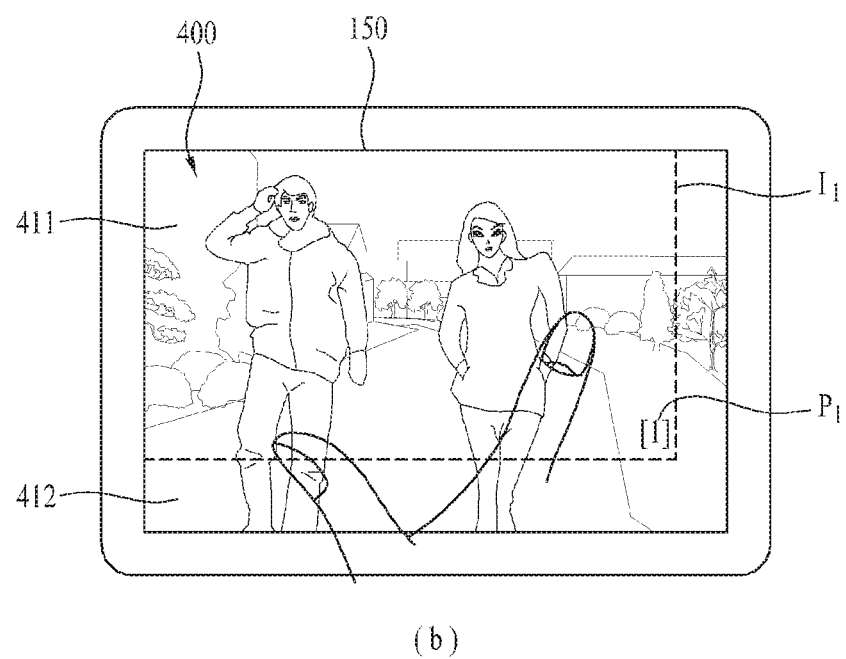

FIG. 7 is a diagram for one example of a synthetic image displayed on a display unit of a mobile terminal according to one embodiment of the present invention.

Referring to FIG. 7, a synthetic image 400 is displayed on the display unit 150 of the mobile terminal 100. Since the synthetic image 400 is created using a first image 310 and a plurality of second images 320, it is difficult for the whole synthetic image 400 to be displayed on a screen of the display unit 150 unless a display magnification is changed. Hence, the synthetic image 400 may be partially displayed on the screen of the display unit 151. Alternatively, a portion or whole part of the synthetic image may be displayed on the screen of the display unit 151 in a manner of having its display magnification reduced.

Referring to FIG. 7(a), a user is able to change a part of the synthetic image 400 displayed on the screen of the display unit 150 by touching and dragging the screen of the display unit 150. The controller 180 can control the display unit 150 to display the synthetic image 400 in a manner of moving the synthetic image 400 on the screen of the display unit 150 in response to a touch command.

Referring to FIG. 7(b), a user is able to change the display magnification of the synthetic image 400 displayed on the screen of the display unit 150 by performing zoom-in or zoom-out on the screen while touching two random points within the screen of the display unit 150. In response to the zoom-in or zoom-out command attributed to the touch, the controller 180 can control the display unit 150 to display the synthetic image 400 in a manner of changing the display magnification of the synthetic image 400 on the screen of the display unit 150.

Meanwhile, according to the present invention, when a synthetic image 400 is displayed on the display unit 150 of the mobile terminal 100, a user can be informed whether the synthetic image 400 exists in a region except the screen of the display unit 150. This is described in detail with reference to FIG. 8 as follows.

Figure 8:
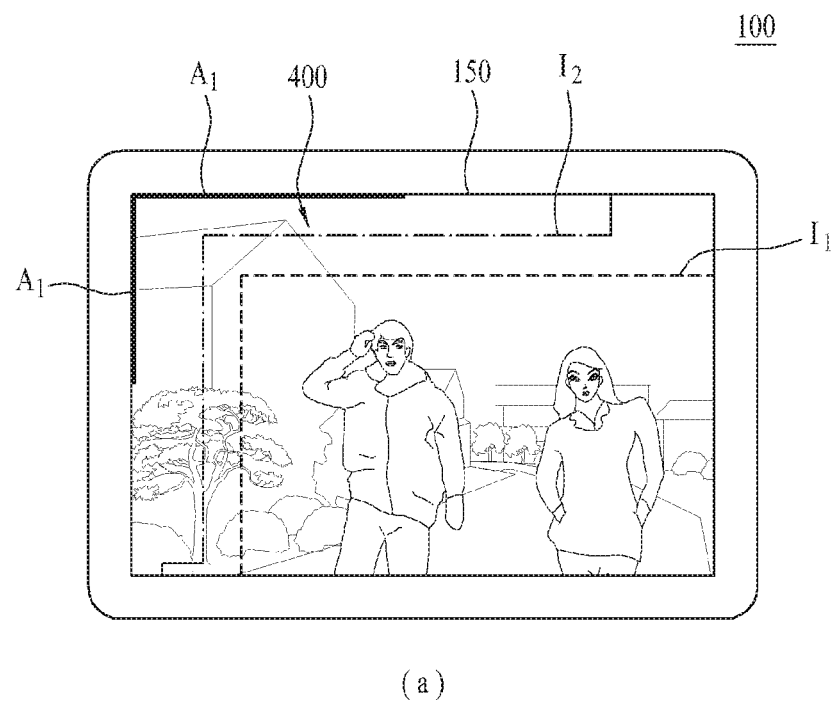
FIG. 8 is a diagram for another example of a synthetic image displayed on a display unit of a mobile terminal according to one embodiment of the present invention.
Figure 8:
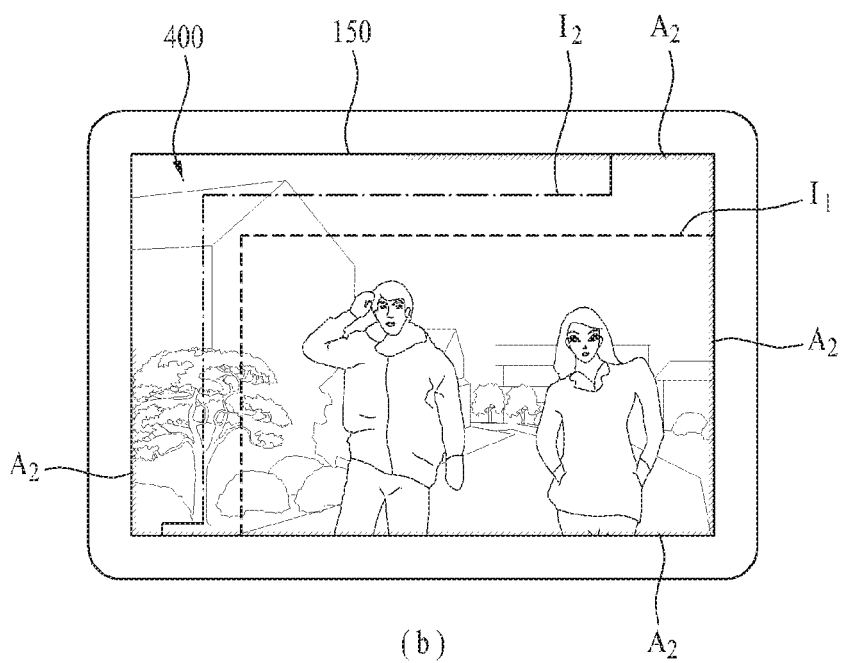

FIG. 8 is a diagram for another example of a synthetic image displayed on a display unit of a mobile terminal according to one embodiment of the present invention.

Referring to FIG. 8, a synthetic image 400 is displayed on the display unit 150 of the mobile terminal 100.

Since the synthetic image 400 is created using a first image 310 and a plurality of second images 320, it is difficult for the whole synthetic image 400 to be displayed on a screen of the display unit 150 unless a display magnification is changed. In this case, the controller 180 can control the display unit 150 to display an indicator A indicating whether a part of the synthetic image 400 not displayed on the screen of the display unit 150 exists.

Referring to FIG. 8(a), an indicator $A_1$ indicating that a continuous image does not further exist can be displayed on a part having no synthetic image 400 failing to be displayed on the screen of the display unit 150, i.e., on an outline part of the synthetic image 400 displayed on the screen of the display unit 150. For instance, the indicator $A_1$ may be denoted by coloring the outline of the synthetic image 400 black, by which the present invention may be non-limited.

Referring to FIG. 8(b), an indicator $A_2$ indicating that a continuous image exists can be displayed on a part having the synthetic image 400 failing to be displayed on the screen of the display unit 150. For instance, the indicator $A_2$ may be denoted by blurring a boundary line having the continuous image exist outside the screen in a part of the synthetic image 400 displayed on the screen of the display unit 150, by which the present invention may be non-limited.

Moreover, in a manner of combining the processes shown in FIG. 8(a) and FIG. 8(b) together, an indicator $A_1$ indicating that a continuous image does not further exist can be displayed on a part having no synthetic image 400 failing to be displayed on the screen of the display unit 150, while an indicator $A_2$ indicating that a continuous image exists can be displayed on a part having the synthetic image 400 failing to be displayed on the screen of the display unit 150.

Meanwhile, according to the present invention, when a synthetic image 400 is displayed on the display unit 150 of the mobile terminal 100, a user can be informed that a part of the synthetic image 400 displayed on the screen of the display unit 150 corresponds to which part of the whole synthetic image 400. This is described in detail with reference to FIG. 9 as follows.

Figure 9:
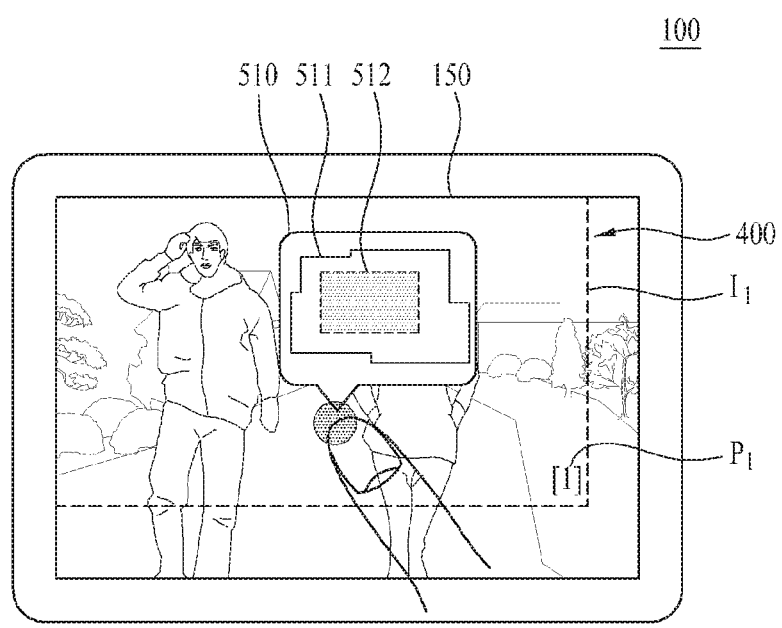
FIG. 9 is a diagram for another example of a synthetic image displayed on a display unit of a mobile terminal according to one embodiment of the present invention.

FIG. 9 is a diagram for another example of a synthetic image displayed on a display unit of a mobile terminal according to one embodiment of the present invention.

Referring to FIG. 9, a synthetic image 400 is displayed on the display unit 150 of the mobile terminal 100.

Since the synthetic image 400 is created using a first image 310 and a plurality of second images 320, it is difficult for the whole synthetic image 400 to be displayed on a screen of the display unit 150 unless a display magnification is changed. If a specific command is received, the controller 180 can control the display unit 150 to display a popup window 510 indicating that a part of the synthetic image 400 corresponds to which part of the whole synthetic image 400.

For instance, the specific command may be inputted in a manner that a user touches a random region of the screen of the display unit 150 over a preset duration.

The popup window 510 includes a first graphic image 511 schematically indicating the whole synthetic image 400 and a second graphic image 512 schematically indicating a part of the synthetic image 400 displayed on the screen of the display unit 150. In particular, the second graphic image 512 is located within the first graphic image 511 by reflecting the location relationship between the whole synthetic image 400 and the synthetic image part displayed on the screen of the display unit 150.

Meanwhile, according to the present invention, when a synthetic image 400 is displayed on the display unit 150 of the mobile terminal 100, a thumbnail image corresponding to each region in the synthetic image 400 is selected to display the corresponding region. This is described in detail with reference to FIG. 10 and FIG. 11 as follows.

Figure 10:
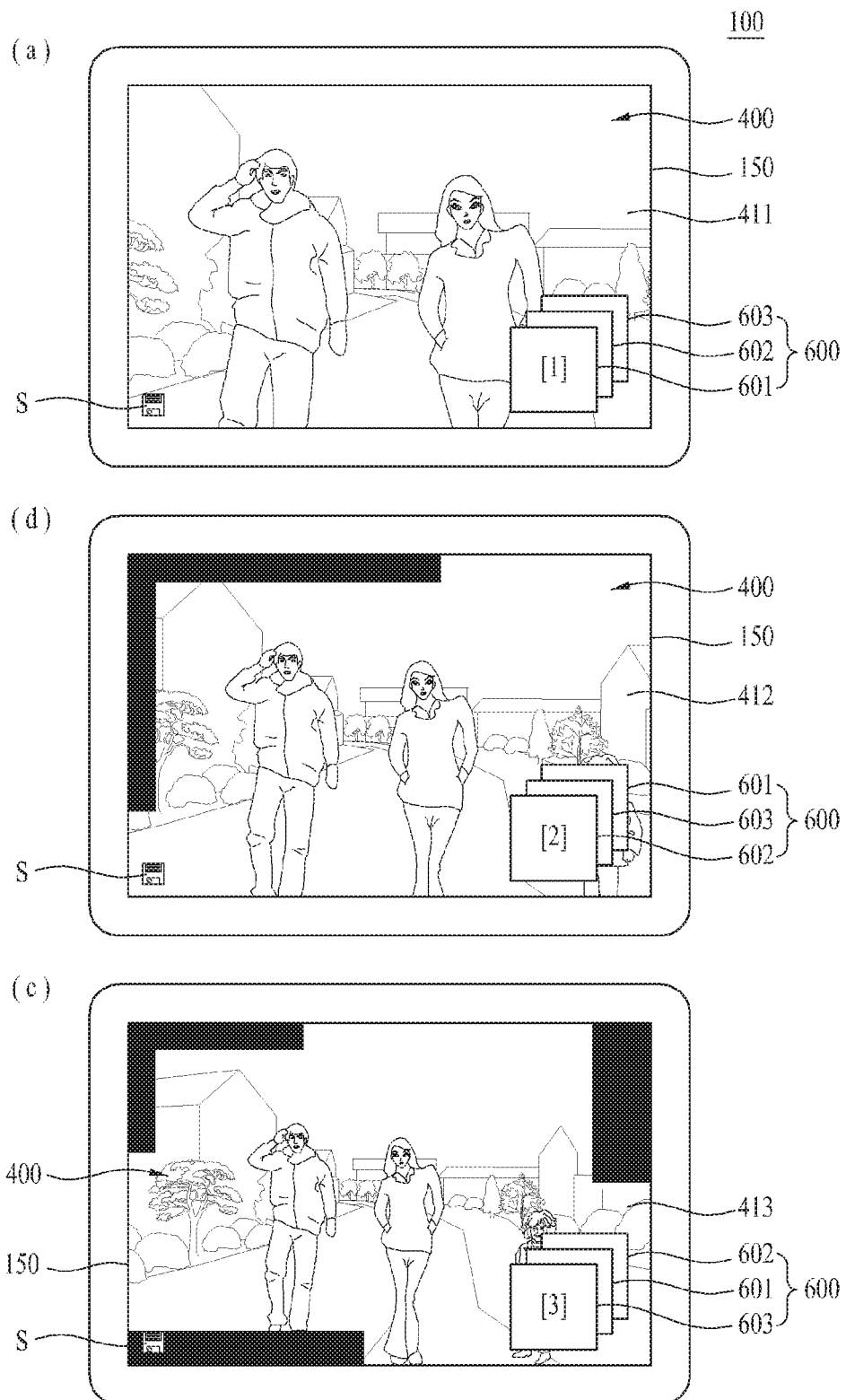
FIG. 10 is a diagram for another example of a synthetic image displayed on a display unit of a mobile terminal according to one embodiment of the present invention.

FIG. 10 is a diagram for another example of a synthetic image displayed on a display unit of a mobile terminal according to one embodiment of the present invention.

Referring to FIG. 10, a synthetic image 400 is displayed on the display unit 150 of the mobile terminal 100.

The controller 180 can control a first thumbnail image 601 corresponding to a first region 411, a second thumbnail image 602 corresponding to a second region 412 and a $3^{rd}$ thumbnail image 603 corresponding to a $3^{rd}$ region 413 to be displayed on a screen of the display unit 150.

The first to $3^{rd}$ thumbnail images 601 to 603 can be displayed in a manner of overlaying each other on a synthetic image 400 displayed on the display unit 150.

The first to $3^{rd}$ thumbnail images 601 to 603 can be displayed in a manner of overlaying each other. In doing so, the first to $3^{rd}$ thumbnail images 601 to 603 are displayed in a manner of overlaying each other by being slightly shifted from each other, whereby a user can recognize that a plurality of the thumbnail images exist. When the first to $3^{rd}$ thumbnail images 601 to 603 are displayed in a manner of overlaying each other, a region corresponding to the thumbnail image on the top is displayed on the screen of the display unit 150. The first to $3^{rd}$ thumbnail images 601 to 603 can be commonly called a thumbnail image 600.

Referring to FIG. 10(a), the first thumbnail image is arranged on the top, the second thumbnail image 602 is arranged under the first thumbnail image 601 in a manner of being overlaid by the first thumbnail image 601 in part, and the $3^{rd}$ thumbnail image 603 is arranged under the second thumbnail image 602 in a manner of being overlaid by the second thumbnail image 602 in part, by which the arrangement order between the second thumbnail image 602 and the $3^{rd}$ thumbnail image 603 may be non-limited. Since the first thumbnail image 601 is arranged on the top, the first region 411 corresponding to the first thumbnail image 601 is displayed on the screen of the display unit 150. If a user selects a save menu S, the first region 411 is saved as a file.

In the screen shown in FIG. 10(a), if a user touches and flicks a part of the thumbnail image 600, a screen shown in FIG. 10(b) can be displayed on the display unit 150. In the screen shown in FIG. 10(a), if a user touches and flicks a part of the thumbnail image 600, the order of the thumbnail image 600 can be rearranged in a manner of arranging the second thumbnail image 602, which was arranged right under the first thumbnail image 601 arranged on the top, on the top and arranging the first thumbnail image 601 on the bottom. Since the second thumbnail image 602 is arranged on the top, the second region 412 corresponding to the second thumbnail image 602 is displayed on the screen of the display unit 150. In some cases, if a width of the second region 412 is not uniform, a partial edge region of the screen of the display unit 150 may be colored in black. If the user selects the save menu S, the second region 412 is saved as a file.

In the screen shown in FIG. 10(b), if a user touches and flicks a part of the thumbnail image 600, a screen shown in FIG. 10(c) can be displayed on the display unit 150. In the screen shown in FIG. 10(b), if a user touches and flicks a part of the thumbnail image 600, the order of the thumbnail image 600 can be rearranged in a manner of arranging the $3^{rd}$ thumbnail image 603, which was arranged right under the second thumbnail image 602 arranged on the top, on the top and arranging the second thumbnail image 602 on the bottom. Since the $3^{rd}$ thumbnail image 603 is arranged on the top, the $3^{rd}$ region 413 corresponding to the $3^{rd}$ thumbnail image 603 is displayed on the screen of the display unit 150. In some cases, if a width of the $3^{rd}$ region 413 is not uniform, a partial edge region of the screen of the display unit 150 may be colored in black. If the user selects the save menu S, the $3^{rd}$ region 413 is saved as a file.

Figure 11:
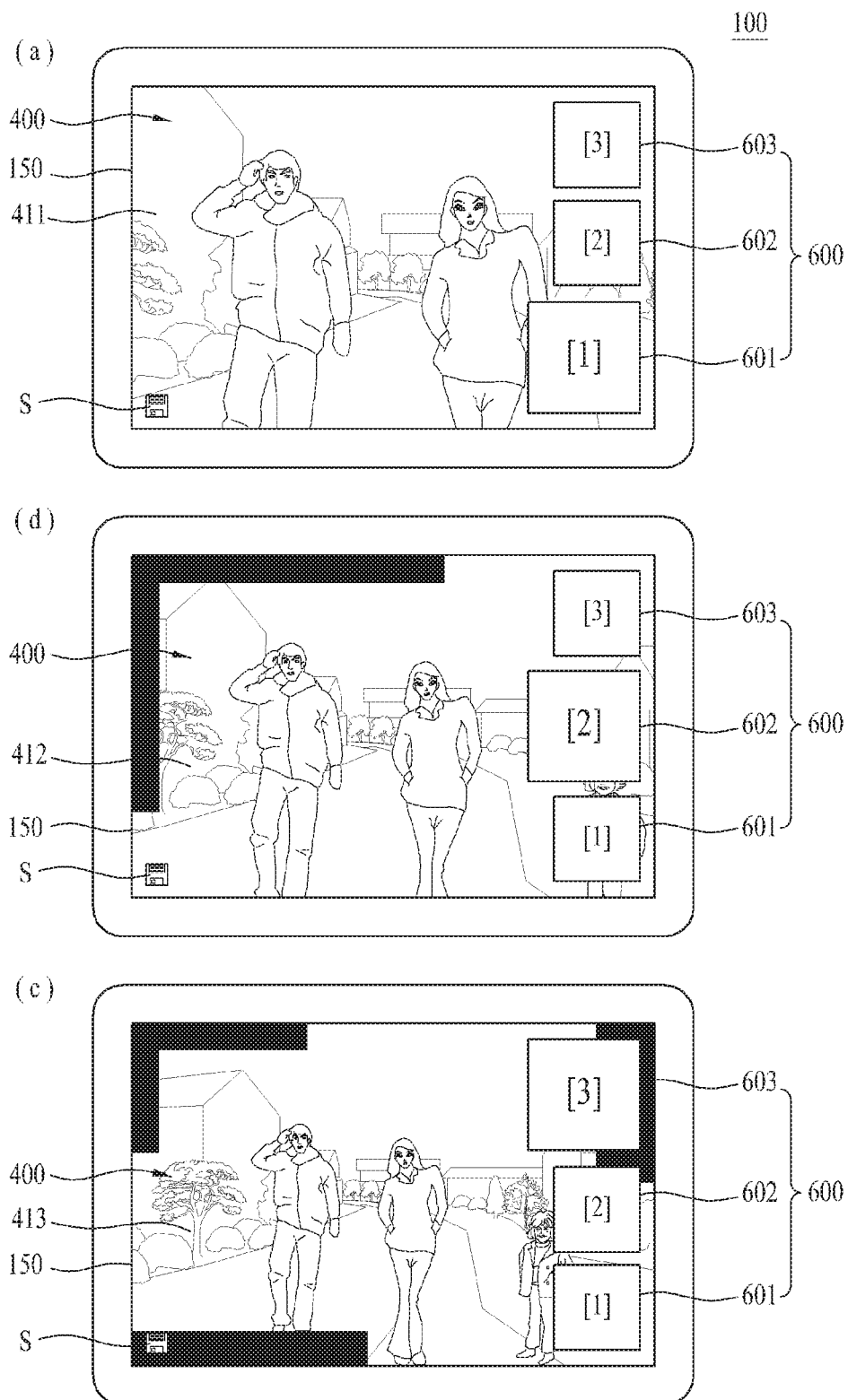
FIG. 11 is a diagram for another example of a synthetic image displayed on a display unit of a mobile terminal according to one embodiment of the present invention.

FIG. 11 is a diagram for another example of a synthetic image displayed on a display unit of a mobile terminal according to one embodiment of the present invention.

Referring to FIG. 11, a synthetic image 400 is displayed on the display unit 150 of the mobile terminal 100.

The controller 180 can control a first thumbnail image 601 corresponding to a first region 411, a second thumbnail image 602 corresponding to a second region 412 and a $3^{rd}$ thumbnail image 603 corresponding to a $3^{rd}$ region 413 to be displayed on a screen of the display unit 150.

The embodiment shown in FIG. 11 differs from the former embodiment shown in FIG. 10 in the following. First of all, the first to $3^{rd}$ thumbnail images 601 to 603 are displayed on the display unit 150 in a manner of being arranged side by side without overlaying each other.

Among the first to $3^{rd}$ thumbnail images 601 to 603, the thumbnail image corresponding to a region displayed on the screen of the display unit 150 and the thumbnail image corresponding to a region not displayed on the screen of the display unit 150 may differ from each other in at least one of a size, a shape, a color and a transparency. For instance, among the first to $3^{rd}$ thumbnail images 601 to 603, the thumbnail image corresponding to the region displayed on the screen of the display unit 150 may differ from the thumbnail image corresponding to the region not displayed on the screen of the display unit 150 in size.

Referring to FIG. 11(a), since a size of the first thumbnail image 601 is greater than that of the second thumbnail image 602 or the $3^{rd}$ thumbnail image 603, the first region 411 corresponding to the first thumbnail image 601 is displayed on the screen of the display unit 150. If a user selects a save menu S, the first region 411 is saved as a file.

In the screen shown in FIG. 11(a), if the user touches the second thumbnail image 602, a size of the first thumbnail image 601 decreases to become equal to that of the $3_{rd}$ thumbnail image 603 and a size of the second thumbnail image 602 increases. And, the second region 412 corresponding to the second thumbnail image 602 is displayed on the screen of the display unit 150. If the user selects the save menu S, the second region 412 is saved as a file.

In the screen shown in FIG. 11(a) or FIG. 11(b), if the user touches the $3^{rd}$ thumbnail image 603, a size of the first thumbnail image 601 becomes equal to that of the second thumbnail image 602 and a size of the $3^{rd}$ thumbnail image 603 increases to the largest. And, the $3^{rd}$ region 413 corresponding to the $3^{rd}$ thumbnail image 603 is displayed on the screen of the display unit 150. If the user selects the save menu S, the $3^{rd}$ region 413 is saved as a file.

According to the present invention, a region directly selected by a user from a synthetic image 400 displayed on the display unit 150 of the mobile terminal 100 can be saved as a file. This is described in detail with reference to FIG. 12 as follows.

Figure 12:
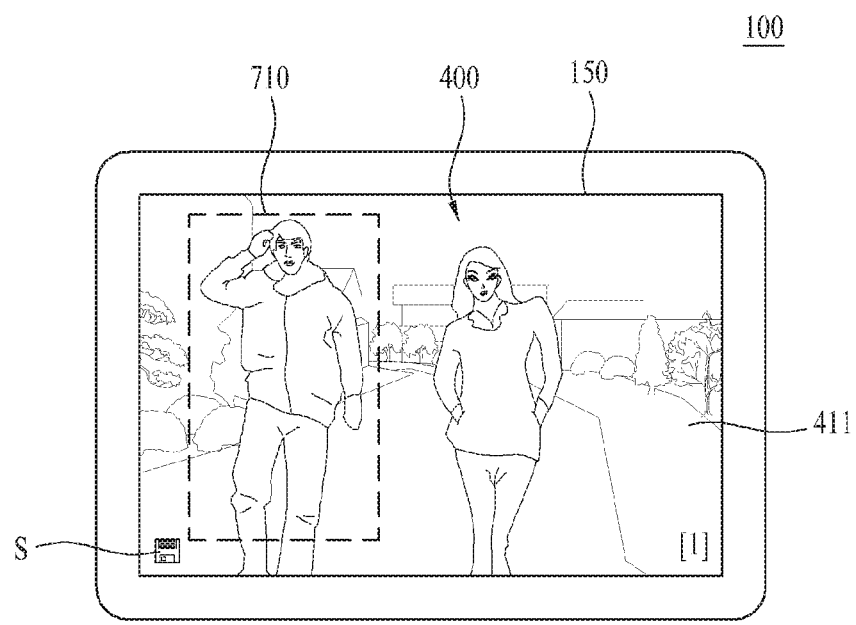
FIG. 12 is a diagram for another example of a synthetic image displayed on a display unit of a mobile terminal according to one embodiment of the present invention.

FIG. 12 is a diagram for another example of a synthetic image displayed on a display unit of a mobile terminal according to one embodiment of the present invention.

Referring to FIG. 12, a synthetic image 400 is displayed on the display unit 150 of the mobile terminal 100.

The controller 180 can control the display unit 150 to display an indicator 710 for indicating a selected region.

A user can adjust a size of the indicator 710 in a manner of touching two random points of an outline of the indicator 710 and then dragging it in and out. The user can shift a location of the indicator 710 on the screen of the display unit 150 by touching and dragging a random point of the outline of the indicator 710. The user can change a part of a synthetic image 400 displayed on the screen of the display unit 150 by touching and dragging a random part on screen of the display unit 150. And, the user can change a display magnification of the synthetic image 400 displayed on the screen of the display unit 150 by zooming in or out on the screen while touching two random points on the screen of the display unit 150.

If the user selects a save menu S, a region corresponding to the indicator 710 is saved as a file.

Meanwhile, according to the present invention, it is able to obtain an editing history of a synthetic image 400 displayed on the display unit 150 of the mobile terminal 100. This is described in detail with reference to FIG. 13 and FIG. 14 as follows.

Figure 13:
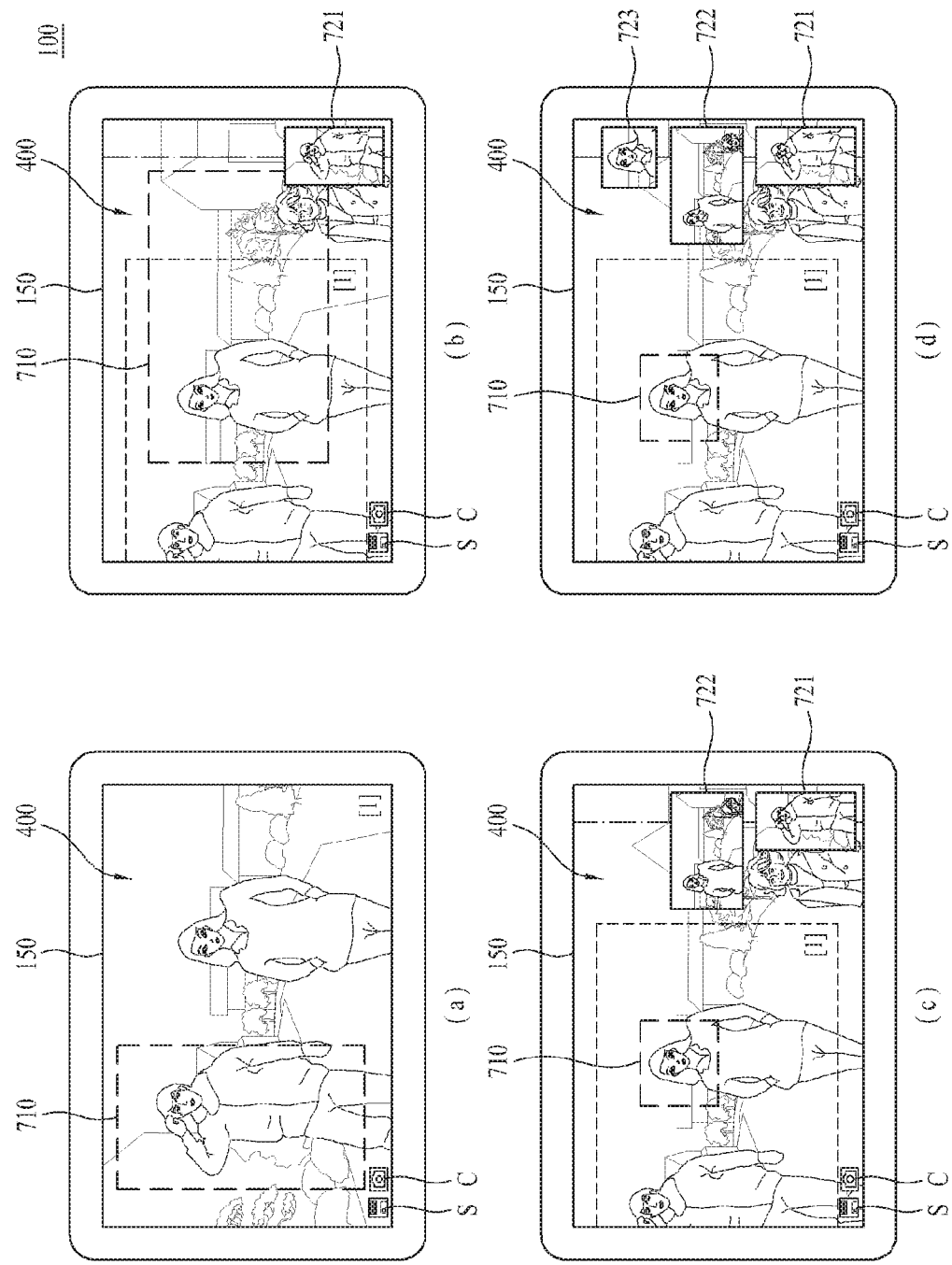
FIG. 13 is a diagram for another example of a synthetic image displayed on a display unit of a mobile terminal according to one embodiment of the present invention.

FIG. 13 is a diagram for another example of a synthetic image displayed on a display unit of a mobile terminal according to one embodiment of the present invention.

Referring to FIG. 13, a synthetic image 400 is displayed on the display unit 150 of the mobile terminal 100.

The controller 180 controls the display unit 150 to display an indicator 710 configured to indicate a selected region.

If a user selects a capture menu C from the screen shown in FIG. 13(a), referring to FIG. 13(b), a first capture thumbnail image 721 corresponding to the region indicated by the indicator 719 is displayed on the display unit 150.

In the screen shown in FIG. 13(b), a user can change a location or size of the indicator 710 or a location or display magnification of the synthetic image 400 displayed on the screen of the display unit 150. If the user selects the capture menu C from the screen shown in FIG. 13(b), referring to FIG. 13(c), a second capture thumbnail image 722 corresponding to the region indicated by the indicator 710 in FIG. 13(b) is displayed on the display unit 150. In doing so, the first capture thumbnail image and the second capture thumbnail image 722 can be arranged side by side without overlaying each other.

In the screen shown in FIG. 13(c), a user can change a location or size of the indicator 710 or a location or display magnification of the synthetic image 400 displayed on the screen of the display unit 150. If the user selects the capture menu C from the screen shown in FIG. 13(c), referring to FIG. 13(c), a $3^{rd}$ capture thumbnail image 723 corresponding to the region indicated by the indicator 710 in FIG. 13(c) is displayed on the display unit 150. In doing so, the first capture thumbnail image, the second capture thumbnail image 722 and the $3^{rd}$ capture thumbnail image 723 can be arranged side by side without overlaying each other.

According to the present embodiment, the user can obtain an editing history of the synthetic image 400 in the meantime through the capture thumbnail images.

Meanwhile, according to the present invention, it is able to check an indicator indicating each of the regions captured in the meantime at a time. This is described in detail with reference to FIG. 14 as follows.

Figure 14:
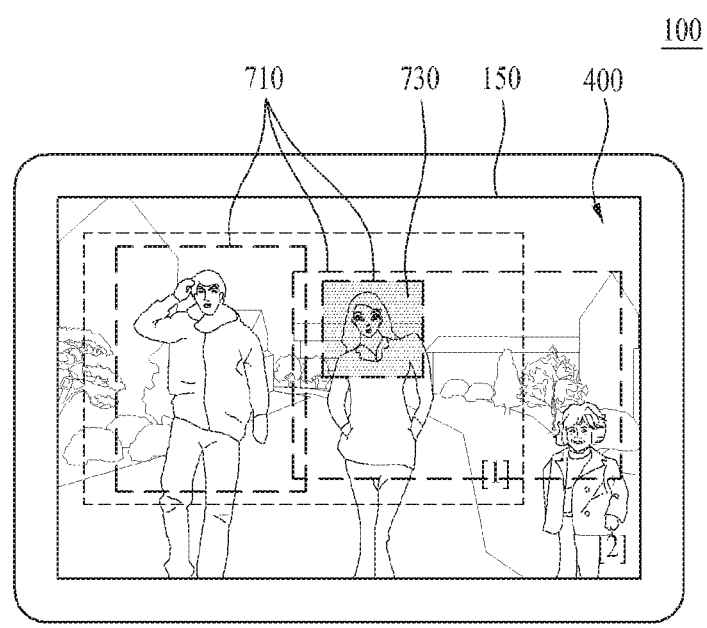
FIG. 14 is a diagram for a further example of a synthetic image displayed on a display unit of a mobile terminal according to one embodiment of the present invention.

FIG. 14 is a diagram for a further example of a synthetic image displayed on a display unit of a mobile terminal according to one embodiment of the present invention.

Referring to FIG. 14, a synthetic image 400 is displayed on the display unit 150 of the mobile terminal 100.

If a specific command is detected, the controller 180 controls the display unit 150 to display an indicator 710 indicating each of the regions captured for the synthetic image 400. Hence, a user can check the regions captured in the meantime correspond to which parts of the synthetic image 400 and is also able to check the location relationship between the regions captured in the meantime.

According to an embodiment, the controller 180 can give a visual effect 730 in a manner of highlighting or emphasizing a most overlapping region among the regions captured for the synthetic image 400 for example.

According to the present invention, audio corresponding to a part of a synthetic image 400 displayed on the display unit 150 of the mobile terminal can be provided. This is described in detail with reference to FIG. 15 and FIG. 16 as follows.

Figure 15:
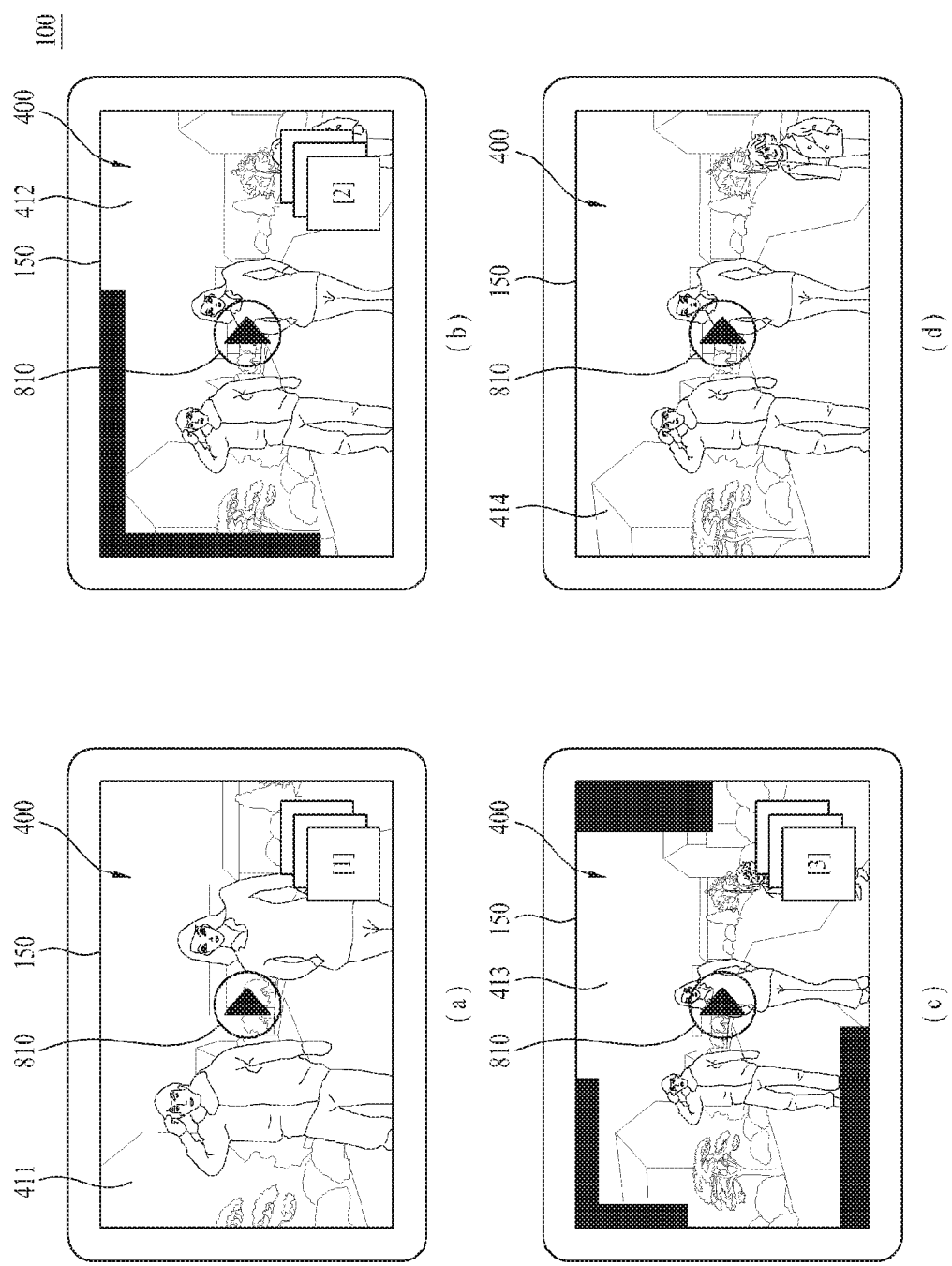
FIG. 15 is a diagram to describe one example of a method for providing audio corresponding to a part of a synthetic image displayed on a display unit of a mobile terminal according to one embodiment of the present invention.

FIG. 15 is a diagram to describe one example of a method for providing audio corresponding to a part of a synthetic image displayed on a display unit of a mobile terminal according to one embodiment of the present invention.

Referring to FIG. 15, if an audio play command is detected, the controller 180 controls the audio output module 152 to output audio data corresponding to a part of a synthetic image 400 displayed on the display unit 150.

When a first image 310 and a plurality of second images 320 are acquired by the camera 121, external audio signals ranging from a timing point of a first acquired image to a timing point of acquiring a last acquired image are received through the microphone 122 to generate electric audio data.

The controller 180 controls each of the first image and a plurality of the second images to be saved in the memory 160 in a manner of being matched with a part of the audio data corresponding to the timing point of acquiring each of the first image and a plurality of the second images in the audio data.

Referring to FIG. 15(a), when a user selects an audio play menu 810, if an audio play command is detected in response to the selection, the controller 180 controls the audio output module 152 to audio data corresponding to a first region 411 displayed on a screen of the display unit 150. In particular, the controller 180 can control the audio output module 152 to output audio data ranging from a part of the audio data corresponding to a timing point of acquiring a first acquired image to a part of the audio data corresponding to a timing point of acquiring a last acquired image among the images configuring the first region 411. In some cases, since the first region 411 corresponds to the first image 310 acquired by the camera 121, the controller 180 can control the audio output module 152 to output the audio data in a preset interval from a part of the audio data corresponding to a timing point of acquiring the first image 310.

Referring to FIG. 15(b), when a user selects an audio play menu 810, if an audio play command is detected in response to the selection, the controller 180 controls the audio output module 152 to audio data corresponding to a second region 412 displayed on a screen of the display unit 150. In particular, the controller 180 can control the audio output module 152 to output audio data ranging from a part of the audio data corresponding to a timing point of acquiring a first acquired image to a part of the audio data corresponding to a timing point of acquiring a last acquired image among the images configuring the second region 412.

Referring to FIG. 15(c), when a user selects an audio play menu 810, if an audio play command is detected in response to the selection, the controller 180 controls the audio output module 152 to audio data corresponding to a $3^{rd}$ region 413 displayed on a screen of the display unit 150. In particular, the controller 180 can control the audio output module 152 to output audio data ranging from a part of the audio data corresponding to a timing point of acquiring a first acquired image to a part of the audio data corresponding to a timing point of acquiring a last acquired image among the images configuring the $3^{rd}$ region 413. In some cases, since the images configuring the $3^{rd}$ region 413 may include all of the first image 310 and a plurality of the second images 320 acquired by the camera 121, the controller 180 can control the audio output module 152 to output all of the generated audio data.

Referring to FIG. 15(*d*), when a user selects an audio play menu 810, if an audio play command is detected in response to the selection, the controller 180 controls the audio output module 152 to audio data corresponding to a specific region 414 displayed on a screen of the display unit 150. In particular, the controller 180 can control the audio output module 152 to output audio data ranging from a part of the audio data corresponding to a timing point of acquiring a first acquired image to a part of the audio data corresponding to a timing point of acquiring a last acquired image among the images configuring the specific region 414. In this case, the specific region 414 may correspond to the region indicated by the indicator 710 described with reference to one of FIGS. 12 to 14.

Figure 16:
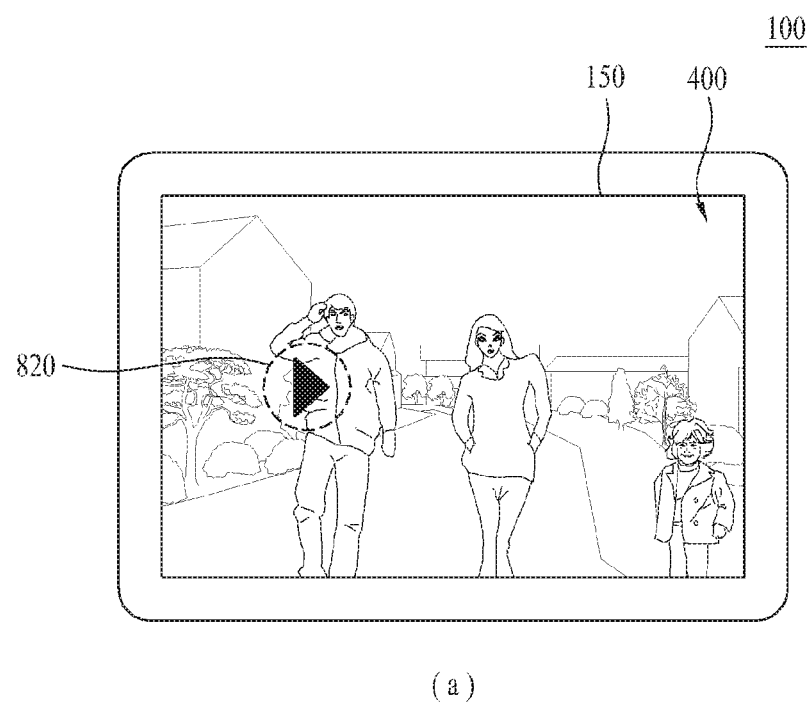
FIG. 16 is a diagram to describe another example of a method for providing audio corresponding to a part of a synthetic image displayed on a display unit of a mobile terminal according to one embodiment of the present invention.
Figure 16:
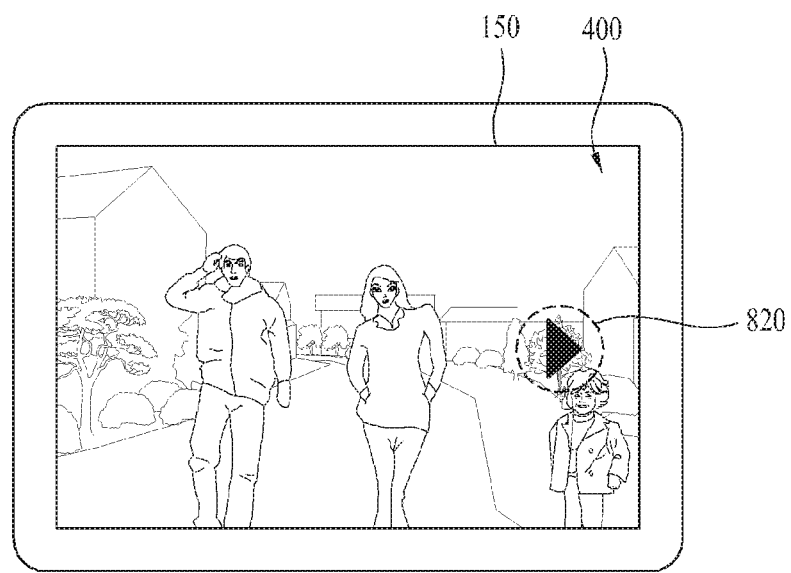

FIG. 16 is a diagram to describe another example of a method for providing audio corresponding to a part of a synthetic image displayed on a display unit of a mobile terminal according to one embodiment of the present invention.

Referring to FIG. 16, if an audio play command is detected, the controller 180 controls the audio output module 152 to output audio data corresponding to a part of a synthetic image 400 displayed on the display unit 150.

The controller 180 controls each of the first image and a plurality of the second images to be saved in the memory 160 in a manner of being matched with a part of the audio data corresponding to the timing point of acquiring each of a first image and a plurality of second images in the audio data.

When the first image 310 and a plurality of the second images 320 are acquired by the camera 121, external audio signals ranging from a timing point of a first acquired image to a timing point of acquiring a last acquired image are received through the microphone 122 to generate electric audio data.

According to the present embodiment, at least two microphones 122 exist. For instance, one of the two microphones 122 is slanted to one side (e.g., a left side) in the mobile terminal 100, while the other is slanted to another side (e.g., a right side) in the mobile terminal 100.

A user is able to change a location of an audio play menu 820 on a screen of the display unit 150 by touching and dragging a random region of the audio play menu 820 displayed on the display unit 150.

Referring to FIG. 16(*a*), while the audio play menu 820 is slanted to one side on the screen of the display unit 150, if an audio play command is detected, the controller 180 can control the audio output module 152 to output the audio data acquired by the microphone 122 arranged by being slanted to the one side.

Referring to FIG. 16(*b*), while the audio play menu 820 is slanted to the other side on the screen of the display unit 150, if an audio play command is detected, the controller 180 can control the audio output module 152 to output the audio data acquired by the microphone 122 arranged by being slanted to the other side.

According to the present embodiment, since the contents for the parts of the audio data outputted through the audio output module 152 are similar to the former description with reference to FIG. 15, their details shall be omitted from the following description.

According to one embodiment of the present invention, the above-described methods (e.g., operation flowcharts) can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

The above-described mobile terminal can be configured in a manner of selectively combining some or all of the embodiments of the present invention to enable various modifications instead of limitedly applying the configurations and methods of the above-described embodiments.

Specific terminologies used for the following description may be provided to help the understanding of the present invention. And, the use of the specific terminology may be modified into another form within the scope of the technical idea of the present invention. It will be apparent to those skilled in the art that various modifications and variations can be made in the present invention without departing from the spirit or scope of the inventions.

Accordingly, embodiments of the present invention provide various effects and/or features.

First of all, the present invention creates a single synthetic image by synthesizing a plurality of images and utilizes/edits the created synthetic image in various ways, thereby enhancing user's convenience.

Secondly, the present invention provides a solution for providing audio depending on an editing result of a synthetic image using audio data acquired together with an image.

Effects obtainable from the present invention may be non-limited by the above mentioned effect. And, other unmentioned effects can be clearly understood from the following description by those having ordinary skill in the technical field to which the present invention pertains.

It will be appreciated by those skilled in the art that the present invention can be specified into other form(s) without departing from the spirit or scope of the inventions.

The above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a camera;
   a display; and
   a controller configured to control the camera and the display,
   wherein the controller is configured to:
   synthesize a first image and a portion of each second image of a plurality of second images;
   cause the display to display a first portion of the synthesized image comprising the first image and the portion of each second image of the plurality of second images;

cause the display to display a first indicator indicating that a portion of the synthesized image has no adjacent image for displaying;

cause the display to display a second indicator indicating that the synthesized image includes an additional portion that is displayable on the display; and cause the display to display a second portion of the synthesized image in response to an input, wherein the second portion includes at least a portion of the additional portion of the synthesized image.

2. The mobile terminal of claim 1, wherein the first portion is less than an entire portion of the synthesized image.

3. The mobile terminal of claim 1, wherein the controller is further configured to:

cause the display to display the first indicator at a location that does not overlap the first portion of the synthesized image.

4. The mobile terminal of claim 1, wherein the controller is further configured to:

capture, via the camera, the first image after receiving a command; and capture, via the camera, the plurality of second images according to a preset condition.

5. The mobile terminal of claim 4, wherein the plurality of second images are captured subsequent to the capturing of the first image.

6. The mobile terminal of claim 1, wherein the first image and the plurality of second images are captured in real time.

7. The mobile terminal of claim 1, wherein the first image and each of the plurality of second images capture different portions of a same scene.

8. The mobile terminal of claim 1, wherein edges that form a perimeter of the synthesized image are defined according to edges of a plurality of images among the first image and the plurality of second images.

9. An image display method for a mobile terminal having a display, the method comprising:

synthesizing, by a controller, a first image and a portion of each second image of a plurality of second images;

displaying, on the display, a first portion of the synthesized image comprising the first image and the portion of each second image of the plurality of second images;

displaying, on the display, a first indicator indicating that a portion of the synthesized image has no adjacent image for displaying;

displaying, on the display, a second indicator indicating that the synthesized image includes an additional portion that is displayable on the display; and displaying, on the display, a second portion of the synthesized image in response to an input, wherein the second portion includes at least a portion of the additional portion of the synthesized image.

* * * * *